Nov. 2, 1954

W. G. GLENDINNING ET AL
METHOD AND APPARATUS FOR PREVENTING
EXPLOSIONS AND EXTINGUISHING FIRES 2,693,240

Filed Jan. 31, 1949

INVENTORS:
W. G. GLENDINNING
A. M. MACLENNAN

BY Bn. J. Chrony
THEIR ATTORNEY

United States Patent Office 2,693,240
Patented Nov. 2, 1954

2,693,240

METHOD AND APPARATUS FOR PREVENTING EXPLOSIONS AND EXTINGUISHING FIRES

William Gerald Glendinning and Alexander Morrison MacLennan, Farnborough, England, assignors to Graviner Manufacturing Company Limited, London, England Application January 31, 1949, Serial No. 73,716

Claims priority, application Great Britain February 5, 1948

18 Claims. (Cl. 169—2)

This invention relates to improvements in means for the detection of abnormal pressure rises or rates of pressure rise and for counteracting the effects thereof such as the suppression of explosions and the prevention or extinction of fires.

The invention is concerned with the detection of the abnormal rise in pressure developed in the initial stages of incipient fires or explosions of mixtures of air with combustible vapours or gases, sprays, mists, dusts or the like and with the prevention of dangerous or maximum pressure levels and the prevention or extinction of fires resulting from such explosions.

As compared with the explosion of a substance which carries its own oxygen, an explosion of an air gasoline vapour or equivalent mixture has the characteristic that the rate of development of pressure is relatively slow; thus, for example, an explosion of a paraffin spray air mixture may take 0.5 second to develop maximum pressure.

It has been proposed in a fire extinguishing sprinkler system to provide pressure responsive devices in a space to be protected which displace the air in a conduit and by this means trip a hydraulic water supply valve connected to the sprinkler system but such a system could not be expected to act sufficiently rapidly to suppress the explosion itself.

In the protection of oil immersed electrical transformers it has been proposed to provide a pressure responsive device which actuates an electrical cut out switch when the rate of pressure exceeds a predetermined value.

In the known fire extinguishing systems which employ a pressure detecting device, the detecting device has been provided to operate only in response to the high-level pressure developed by a completed explosion and in turn actuates water-discharging means simply to prevent the spreading of the fire resulting from such completed explosion. Such systems are not intended nor are they capable of suppressing a potentially dangerous explosion immediately following ignition before the explosion has been completed or has reached a dangerous level, such detecting device being incapable of operating at the low pressures developed in the initial stages of an explosion before the pressure has reached a dangerous level.

It is a principal object of the present invention to provide a method and apparatus for preventing a dangerous explosion or fire in environments of combustible or inflammable air mixtures by detecting and suppressing an incipient explosion in its initial stages before the explosion is completed or before a predetermined dangerous pressure level has been reached.

According to the present invention, the incipient explosion is detected by sensing the abnormal rise in pressure in the ambient zone of the explosion during the initial stages of the explosion before a predetermined dangerous pressure level is reached, and the detected pressure rise is utilized to distribute rapidly a combustion inhibiting substance before such dangerous pressure level is reached.

According to another aspect of the present invention, the incipient explosion is detected by sensing the abnormal rise in pressure in the ambient zone of the explosion within 0.2 second of the initiation of such abnormal pressure rise, and the detected pressure rise is utilized to release rapidly a combustion inhibiting substance before a dangerous pressure level is reached.

According to another aspect of the present invention, a dangerous explosion in a potentially explosive fluid environment is prevented by sensing a small pressure rise in the ambient zone of the incipient explosion when the rate of pressure rise in such ambient zone is abnormal which occurs during the initial stages of the explosion before a predetermined dangerous pressure level is reached, and the detected pressure rise is utilized to release rapidly into the fluid environment a combustion inhibiting substance before such dangerous pressure level is reached.

It is obvious that the sensitivity of the detecting device must be such as to be insensitive to the normal changes in the condition of the environment in which it is situated. Thus, in aircraft installations the detecting device will be exposed to normal rates of rise in ambient pressure due, for example, to changes in altitude or aerobatics, and of course the detecting device must not be permitted to operated during such normal rates of rise in pressure. Hence, rate of pressure rise is significant in aircraft and thus the detecting device must have a sensitivity which will respond to small pressures only when the rate of rise of pressure exceeds, as in the case of incipient explosions, the normal rate of rise in pressure.

Similarly, if the detecting device is employed in a danger zone of a coal mine, or flour mill, etc., where there also happens to be normal rates of rise in ambient pressure, then again the explosion detecting device must be sensitive to small pressures only when the rate of rise of pressure exceeds the normal rate. However, if the normal ambient pressure conditions in a danger zone of a coal mine or flour mill, etc., are substantially static so that there is no significant normal rate of pressure rise, then an explosion detecting device may be used which is simply pressure-sensitive in the sense that it operates whenever the ambient pressure rises above the normal level.

More specifically according to the invention improved means are provided capable of detecting a rate of pressure rise responsive, for example, in certain applications to rates of pressure rise in excess of fifty pounds per square inch per second within 0.2 of a second of its initiation, said rate of pressure rise detecting means having provided in combination therewith rapidly acting means capable of distributing combustion suppressing or fire preventing or extinguishing substance within 0.5 of a second of the initiation of the rate of pressure rise, whereby the explosion may be suppressed, for example due to explosions in comparatively unconfined spaces such as of fire damp, methane and similar gases in coal mines, which propagate along definite passages or paths.

In accordance with a further feature of the invention means are provided for detecting abnormal rate of pressure rise in liquids such as liquid fuel in an aircraft fuel tank, and said means are disposed so that liquid pressure is applied thereto when abnormal deceleration is applied to the aircraft. In this application the rate of pressure rise detecting device has combined therewith rapidly acting explosive means for effecting discharge of fire preventing or extinguishing appliances upon the aircraft under crash conditions and thus act to prevent or extinguish crash fires.

In the case of explosions in confined spaces, since a rise of pressure at some point within a space of finite volume can be detected almost instantaneously at any other point within that space, the initiation of counteracting or suppressing means by appliances in accordance with the invention may generally be achieved with much greater rapidity than by appliances functioning in response to rise in temperature. In the case of explosions in comparatively unconfined spaces the superiority of response is the more marked in cases in which the origin of an explosion producing rises in pressure and temperature within the space is remote from the detecting device or devices employed.

In order that an explosion may be suppressed before a high pressure has been developed, the rapid response of the detecting means must be backed up by a rapidly acting explosion suppressing or fire extinguishing device and a rapidly acting explosive charge may be employed to burst a container for the explosion suppressing or fire preventing or extinguishing substance mounted within the space or resort may be made to some other suitable method of rapidly releasing the substance under high pressure.

Similarly, in the case of explosions originating at the coal face in a mine or other point, the rate of pressure rise responsive detector is backed up by rapidly acting explosion suppression devices or fire extinguishing appliances spaced a sufficient distance from the detector, away from the point of explosion origin, to ensure that the suppressing substance or fire extinguishing medium is scattered or discharged to fill and block the passage ways or paths to prevent propagation of the explosive wave along said passage ways or paths.

Certain embodiments of the invention will now be described by way of example with reference to the accompanying drawings in which.

Figure 1:
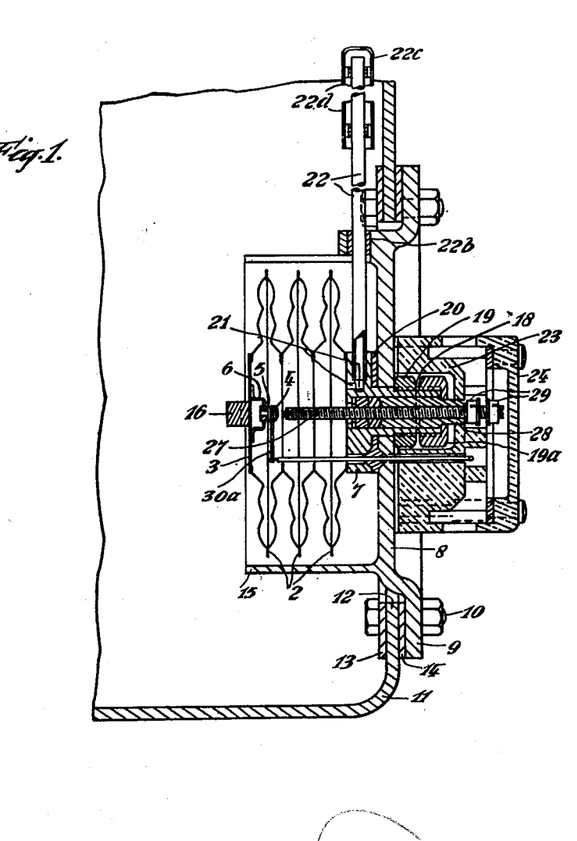
Figure 1 is a sectional view of a rate of pressure rise detecting device shown secured to an aircraft fuel tank, the device being assumed to be submerged in the fuel.
Figure 2:
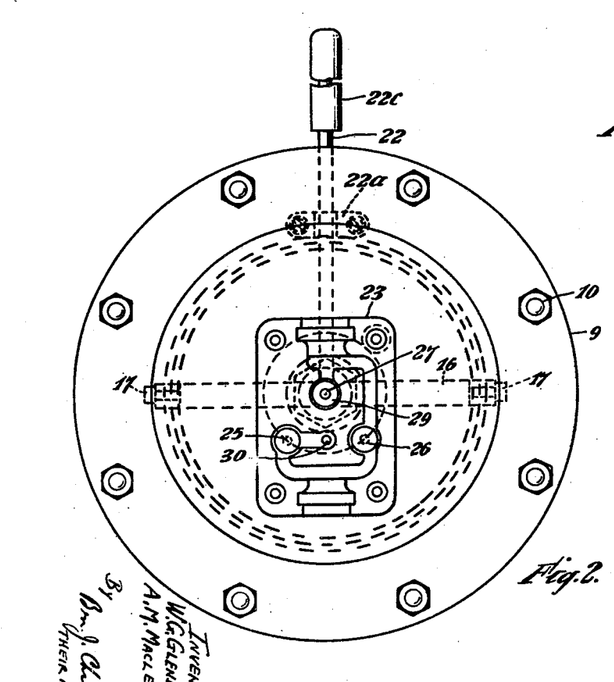
Figure 2 is a plan view of Figure 1 observed from outside the fuel tank, the terminal block cover being shown removed.

Referring now to Figures 1 and 2, numeral 2 denotes a plurality or stack of thin metal sheet capsules of the kind used in barometer pressure variation detecting and recording instruments, three such capsules being shown formed into a stack. A plate 3 is secured to the central aperture of the external capsule 2 and is provided with a contact stud secured in an insulation sleeve 5 secured in a bracket device 6 secured to plate 3.

A flanged stem 7 is secured by the flange to the other external aperture in capsule 2, the stem projecting through a hole in a mounting device 8 which is secured by its flange 9 and bolts 10 to the fuel tank 11 in which an opening 12 is formed for this purpose. As fuel tank 11 may be of flexible material a metal ring 13 is provided for bolts 10, and a sealing washer 14 is provided between flange 9 and the tank 11 to prevent leakage of fuel.

Device 8 incorporates a rim 15 which surrounds capsules 2 to protect these from mechanical damage and from the effects of surging of fuel in tank 11, and a buffer bar 16 secured to rim 15 by screws 17 prevents expansion of capsules 2 as will be subsequently explained.

Flanged stem 7 screw threaded at 18 is provided with a nut 19 whereby the stack of capsules 2 is firmly secured to device 8, a sealing washer 20 being interposed between the flange of stem 7 and the wall of device 8 to prevent leakage of fuel.

The flange of stem 7 is provided with a small orifice 21 which is connected by a capillary tube 22 to the air space in the fuel tank to permit air to bleed from the interior of capsules 2 so as to equalise pressure due to variations in altitude, and an orifice of about .040" diameter is sufficient to ensure equalisation in a fuel tank in an aircraft which is dived at the fastest rate practicable without causing extension or contraction of capsules 2.

Similarly fuel tanks are sometimes pressurised to drive the fuel to the aero engine and such pressure increase is also equalised by orifice 21 and tube 22. Capsules 2 are therefore not affected by normal pressure variation.

Tube 22 is located in a slot 15a in rim 15 and is held by a clamp 22a secured to device 8, a resilient sleeve 22b being fitted over tube 22.

To prevent fuel from entering tube 22 when an aircraft flies inverted or in a steep dive a thimble or hood device 22c is fitted over the open end thereof being secured thereto by a pair of spider shaped supports 22d which only permit slow passage of fuel so as to constitute a constriction.

A known form of electrical terminal block device 23 is mounted upon device 8 and is provided with cover plate 24 shown removed from the block in Figure 2.

Block 23 is provided with moulded-in terminals 25 and 26 to which electrical leads from a supply source such as an aircraft battery is connected. A contact screw 27 secured in insulation sleeve 28 mounted in stem 7 and secured therein by nut 19a is provided as shown in Figure 1 and projects into close proximity to contact screw 4 the contact gap being adjustable by rotation of screw 27, electrical lead clamping and locking nuts 29 being provided as shown. An insulated lead wire 30 is secured to stud 4 by flexible contact tag 30a and is connected to terminal 25.

Electrical leads from an appliance to be energised are connected to terminals 26 and nuts 29 and when contacts 27 and 4 are brought together due to an abnormal rate of pressure rise being applied to capsules 2 the circuit from the current supply source is closed via terminal 25, lead 30, contact 4, screw 27, causing energisation of the appliance.

Figure 5:
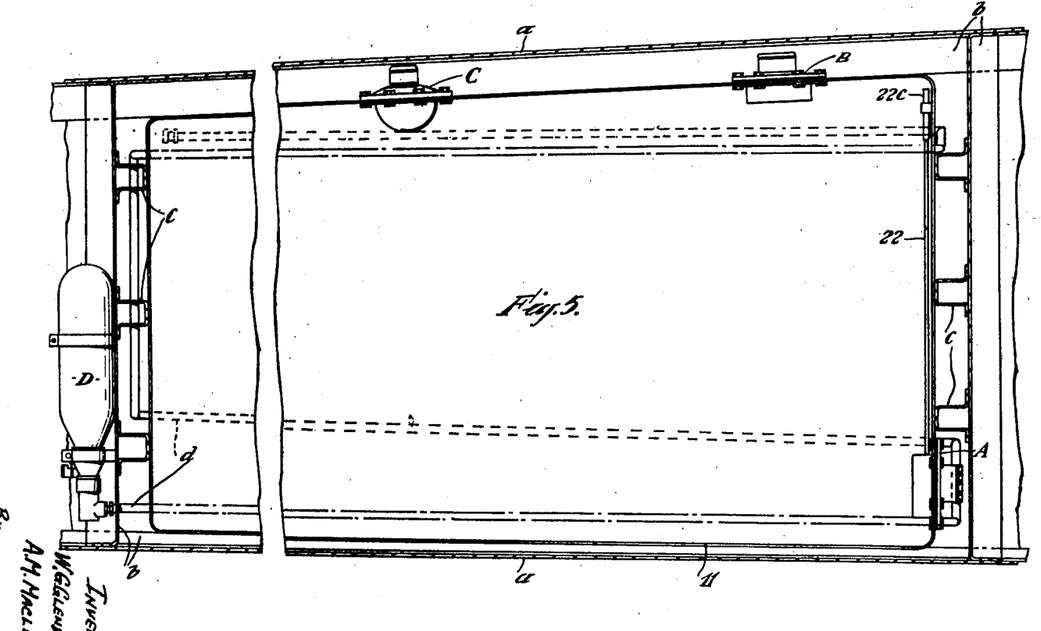
Figure 5 is a partial sectional view of an aircraft wing or similar structure showing a fuel tank mounted therein, said fuel tank being shown in section and having appliances according to Figures 1 and 3 mounted therein.

The detecting device shown in Figure 1 is assumed to be mounted as shown in Figure 5 at A in which position capsules 2 are submerged in the fuel in the tank.

A practically identical detecting device is mounted at B in the top of tank 11 in which case however tube 22 may be deleted, orifice 21 opening direct into the space above the fuel level.

Figure 3:
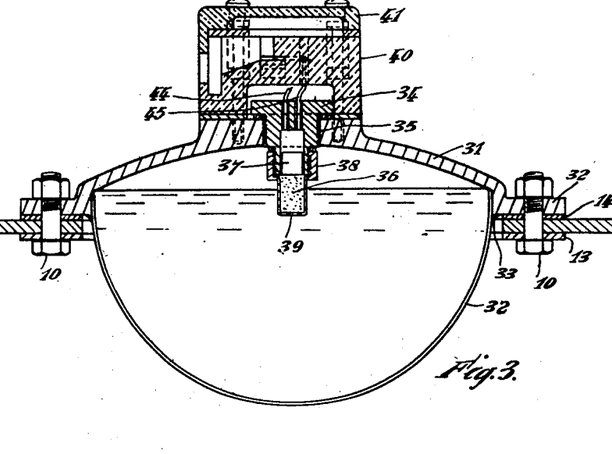
Figure 3 is a sectional view of an explosion suppressing or fire preventing or extinguishing substance container provided with a rapidly acting detonating or explosive device for distributing or scattering said substance, the device being shown mounted in the top of an aircraft fuel tank.
Figure 4:
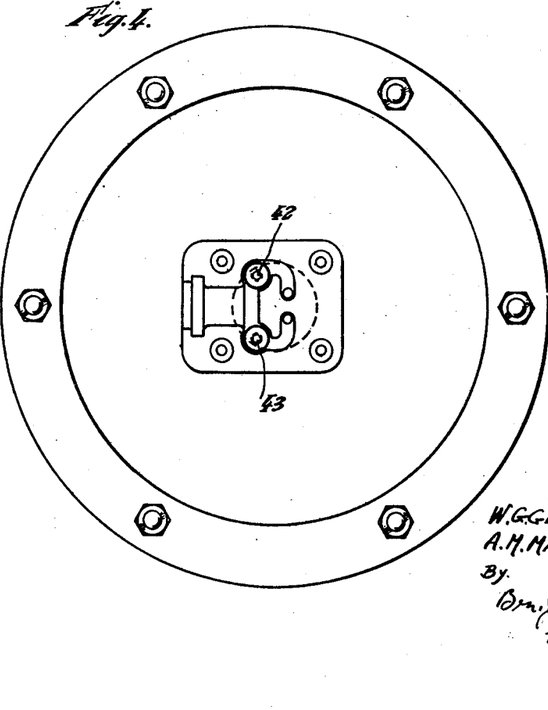
Figure 4 is a view of Figure 3 similar to Figure 2 of Figure 1.

The detecting device shown at B Figure 5 is connected electrically to the appliance shown in Figures 3 and 4 and denoted C in Figure 5 and this comprises a rigid casting or moulding device 31 secured by a flange 32 to tank 11 in similar manner as device 8, that is by identical bolts 10, clamping ring 13 and sealing washer 14. Device 31 has a hemispherical or otherwise shaped frangible portion 32 secured thereto by soldering or other means in a liquid tight manner at 33 and is provided with a plug device 34 screwed into a filling orifice 35 formed in device 31 whereby explosion suppressing or fire preventing or extinguishing substance can be introduced into the appliance.

Plug 34 is provided with an explosive charge 36 electrically ignited by an igniter device 37 this charge being enclosed in a holder 38 screwed onto plug 35 and having a frangible portion 39, projecting into the centre of the spherical portion 32.

A known form of terminal block device 40 is mounted upon device 31 and is provided with cover 41 shown removed in Figure 4 to expose terminals 42 and 43 to which leads 44 and 45 from igniter 37 are connected to terminals 26 and 27a of the detecting device shown at B Figure 5.

Igniter device 37 and explosive charge 36 are not of the usual kind of mine blasting low tension electric fuse for ordinary explosives such as gun powder or cordite, they are of the exceptionally fast operating kind generally known as detonators.

Referring now to Figure 5 appliances as shown in Figures 3 and 4 are denoted C, and a known type of electrically energised and explosive actuated fire extinguisher is shown at D.

Letter *a* denotes skin surfaces of an aircraft and *b* denotes wing structure members supporting fuel tank 11, *c* denoting abutment members. Fire extinguishing substance distributing piping of known construction is denoted *d* which extends around fuel tank 11.

It is known that in the case of fuel tanks in military aircraft these may be penetrated by incendiary bullets, in which case the fuel vapour in the tanks is ignited and explodes, fracturing part of the aircraft structure or wing and scattering burning fuel thereover causing the aircraft to come down in flames.

Experiments have shown that gasoline vapour in free air develops a pressure of about 80 lbs. per square inch .040 second after ignition but that kerosene mist takes between .2 to .3 second to develop maximum pressure of about 40 to 60 lbs. per square inch.

With a view to ascertaining if explosions in kerosene fuel tanks upon jet power unit driven aircraft could be suppressed by appliances of the kind described above a detecting appliance of the kind shown in Figures 1 and 2 was enclosed in a metal container provided with means for injecting a predetermined quantity of kerosene mist by a high pressure spray pump and for igniting this to cause an explosion pressure of about 40 to 50 lbs. per square inch to be developed as shown upon a pressure gauge.

Figures 6, 7:
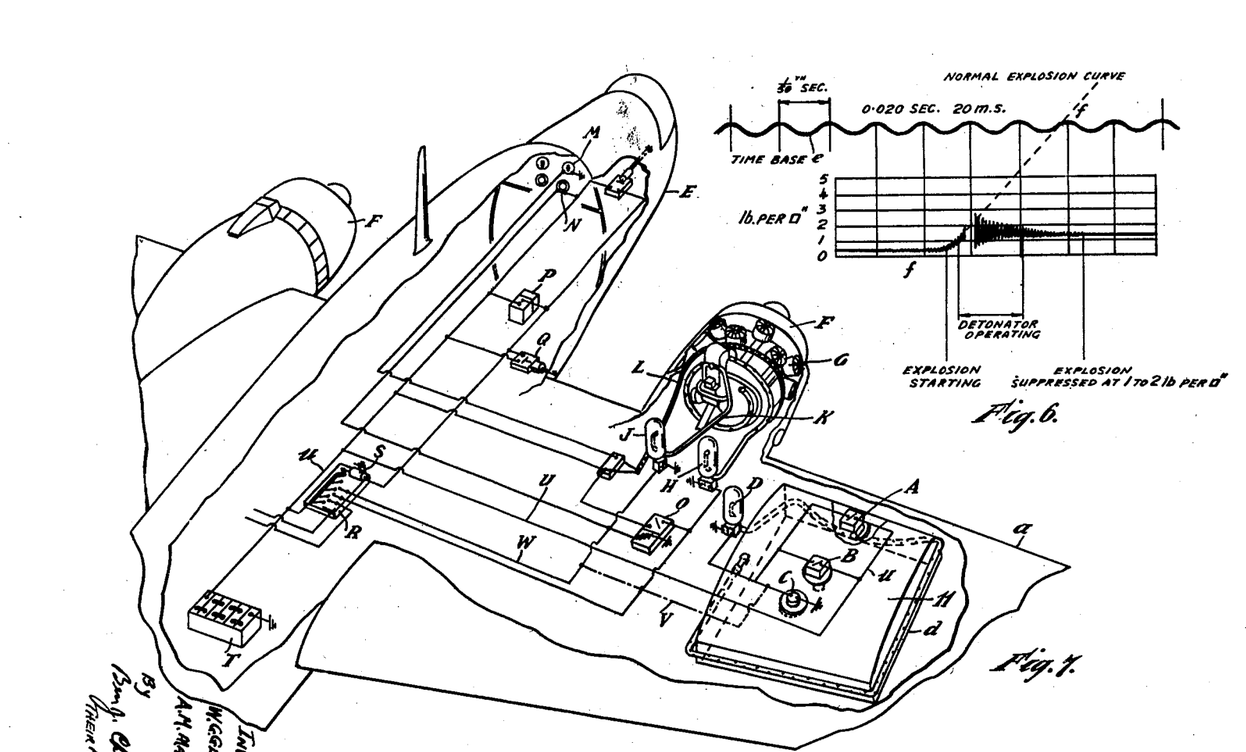
Figure 6 shows a photographic record of cathode ray beam oscillograph of a suppressed explosion in a container.
Figure 7 is a pictorial representation of an aircraft partly in section showing the electrical wiring of a fire preventing and extinguishing system.

The results were recorded by a combination cathode ray oscillograph and photographic recording apparatus as shown in the graphs in Figure 6, which shows a portion of a photographic film or strip.

The film is provided with a time base as shown at $e$ which is produced by a cathode ray oscillated by 50 cycle electric current.

The explosion or pressure recording beam was actuated by an electrostatic condenser device in the wall of the container so that a deflection proportional to the pressure was produced.

With the recording apparatus functioning and the pressure recording beams recording approximately zero pressure, the graph produced by an explosion is shown at $f$ which, when extended, would be seen to show that the maximum pressure developed of about 40 to 50 lbs. per square inch took .2 to .3 second to develop.

With a view to ascertaining the effectiveness of the device shown in Figure 1, the terminals were connected to the electrostatic condenser, and, with a contact gap of about .020" it was found that the recording beam was stopped within .010 second after initiation of an explosion, indicating closure of contacts 4 and 27.

With a view to suppressing an explosion under these conditions a miniature device of the kind shown in Figures 3 and 4 was then introduced into the container the fast operating exploder or detonator scattering a small quantity of fire extinguishing fluid on ignition by appliance B.

In this case contacts 4 and 27 were connected to an electric current supply and to terminals 42 and 43 to cause an explosion and the graph shown in Figure 6 shows the results of the ignition of a kerosene mist spray and the suppression of the resultant explosion.

As will be seen the cathode recording beam commences to rise, following graph $f$, as the result of the incipient kerosene spray explosion but is intercepted after approximately half a cycle as shown on graph $e$ after commencement of the pressure rise indicating a time lag of approximately .010 second. At this point the exploder detonates causing scattering of the fire extinguishing fluid with resultant disturbance of the cathode ray beam, this lasting for about one cycle on graph $o$, indicating that detection took place within .010 second and explosion suppression took place within an additional .020 second involving a total time lag of .030 second from explosion of the kerosene spray until suppression of the explosion.

The graph $f$ shows that the cathode ray beam had a slight zero error before the explosion took place; that the maximum pressure rise was about 2 lbs. per square inch and that a resultant pressure increase in the container of about one lb. per square inch remained due to presence of fire extinguishing vapour. As will be appreciated, if the pressure of 2 lbs. per square inch had been applied gradually the orifice 21 would have caused pressure equalisation internally in and externally of diaphragms 2 and contacts 4 and 27 would not have closed. The increase in pressure of about 2 lbs. per square inch however took place in about .020 second corresponding to a rate of pressure rise of 100 lbs. per square inch in one second which does not permit pressure equalisation in diaphragms 2 and consequently contacts 4 and 27 are forced together.

The utility of the above described appliances upon aircraft will now be explained with reference to Figure 7 which shows a pictorial representation of an aircraft denoted E provided with engine nacelles F and engine or power units G.

The aircraft is provided with a known form of fire preventing and extinguishing system comprising power unit fire extinguishers H supplying a fire extinguishing spray pipe I and an air intake extinguisher J connected to pipe system K and arranged in well known manner.

The system further comprises fire detector appliance L connected to a pilot's fire warning lamp M and pilot operated fire extinguisher switch N adapted to effect instantaneous discharge of fire extinguisher J and delayed discharge of extinguisher H due to action of delay action switch O also of known type.

Inertia operated switch P and impact detector switches Q operate relay R by energising its coil S from battery T when a crash occurs.

Fuel tank 11 is indicated mounted in aircraft E outside the starboard aircraft power unit G and are shown fitted with appliances A and B and C, together with extinguisher D and distributing pipe $d$.

As will be seen electric lead U from battery T is connected to appliances A and B in such a manner that when the contacts in these close, appliances C and D are energised from battery T to effect operation thereof. An auxiliary lead V is shown in chain dotted lines from leads W which extends from a pair of contacts on relay R which will be energised from battery T in case a crash occurs, this arrangement only being used upon civil aircraft.

In case the wing of a civil aircraft should strike an obstruction such as a tree or a church spire this might not be sufficient to operate appliances P and Q, but the abnormal deceleration applied to the wing of the aircraft would cause the fuel in tank 11 to move forward and apply a rapidly increasing rate of pressure to capsules 2 in device A thereby causing closure of contacts 4 and 27 with consequent operation of appliance C as well as discharge of extinguishers D, H and J whereby the risk of fire owing to the damage to the aircraft and power plant as well as to the fuel tank would be greatly decreased owing to the discharge of the extinguishing equipment, but it should be noted that the fuel tanks and power unit in the port wing would not be affected which is an important feature in this type of crash equipment.

In the case of military aircraft if an incendiary bullet is fired into tank 11 causing the fuel vapour above the liquid level to explode, appliance B will detonate appliance C to scatter fire extinguishing liquid, preferably methyl bromide, in the fuel vapour space, thus suppressing the explosion before the pressure due to this rises more than 2 to 3 lbs. per square inch above normal thus suppressing the explosion and preventing any resultant damage and fire.

It may be noted that in this case connection V will not be used as this would cause discharge of extinguishers J and H thus causing loss of power which would be the last thing that would be desired under aerial combat conditions.

It may however be noted that if an incendiary or other bullet penetrates the liquid in tank 11 the hydraulic shock wave will operate appliance A, but in any case owing to the inter-connections shown in the drawing, operation of either appliance A, B or both will effect operation of both appliances C and D and, apart from the desirability of suppressing the explosion by appliance C, it is also desirable to discharge fire extinguishing fluid in the space surrounding the tank, in case flaming fuel might be sucked through the tank wall by the exit of the incendiary bullet by which means ignition of the fuel vapour in the tank bay might be caused.

As regards the quantity of fire extinguishing liquid required in appliance C it is estimated that 1 lb. methyl bromide is adequate to suppress an explosion in a 100 gallon fuel tank when this is filled with fuel vapour the tank being practically empty of fuel. Larger sizes of fuel tanks will therefore be provided with additional appliances C, one for each 100 gallon capacity. It may also be noted that owing to the high volatility of methyl bromide only slight contamination of fuel in tank 11 is likely to be caused by the discharge of appliance C and consequently fuel can be drawn from the tank even if an incendiary bullet has passed therethrough causing operation of appliances C and D, unless of course the fuel piping has been damaged by bullets or other causes.

In the case of the application of the invention in the suppression of explosions in coal mines and the like it is well known that certain types of coal give off volumes of inflammable gas such as hydrogen or more generally methane or fire damp and that when 10% methane is mixed with air, the mixture is highly explosive.

Figures 8, 9:
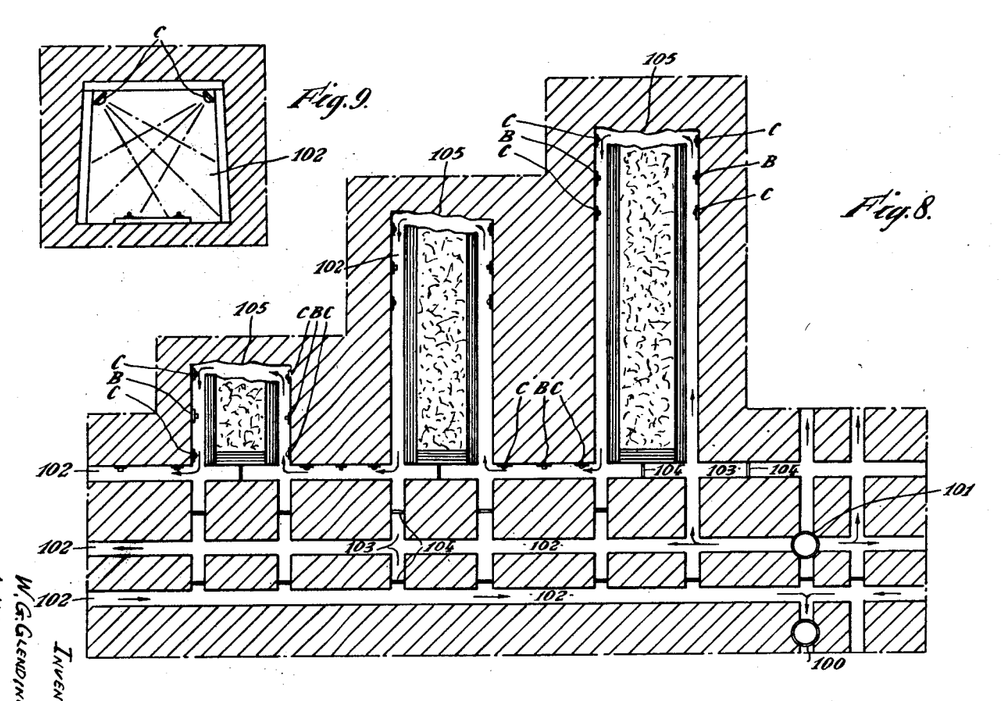
Figure 8 is a view of a coal mine showing one particular system of working, and the arrangement of explosion detecting and suppressing appliance thereof.
Figure 9 is a section of a mine roadway or gallery.

Referring now to Figure 8, 100 denotes a ventilation up draught shaft or pit, and 101 denotes the down draught shaft or pit. The roadways or galleries 102 have the ventilating air flowing therein in the direction indicated by the arrows, whereas transverse roadways or galleries 103 are provided with doors or fixed shuttering 104 to ensure that the ventilating air passes to the actual coal workings or faces 105.

During the mining operation or coal cutting it is known that the above mentioned gases emanate from the coal face and while the ventilating system in the mine is relied upon to carry such gases away, if momentarily the methane gas and air mixture becomes of such proportion that it is highly explosive, and if at the same time a spark is caused by a miner's pick or by coal cutting machinery, then a serious explosion may result.

Experiments have shown that the speed of propagation of an explosive wave varies in accordance with conditions such as the size of the duct or passage in which it occurs, and dependent upon whether the duct or passage is open at both ends or closed at one end.

The initial speed of propagation of 10% methane gas and air mixture explosive wave in the large bore tube closed at one end appears to be between 10 ft. and 20 ft. per second, this increasing rapidly after initiation.

The effect of an explosion upon miners is serious. Usually their clothes are saturated with gas and coal dust so that the clothes are stripped off, serious burns being caused by the flaming gas. It appears, however, that it is the high pressures (similar to the pressures developed by ignited kerosene spray) which have fatal effects owing to crushing.

The appliances described can detect a rate of pressure rise in excess of 50 lbs. per square inch per second within .01 to .02 seconds of its initiation, and can furthermore scatter explosion suppressing substance right across the passageways or galleries leading to the coal face within a further .02 to .05 seconds, ensuring completion of the whole operation within .1 second, and consequently an explosion can be suppressed some feet away from its point of origin.

In explosive or fiery mines it is common practice to mount balanced trays loaded with stone dust near the roof of the roadways or galleries, these being tilted by an explosive wave to produce curtains of explosion suppressing dust, but this cannot of course be expected to operate with the rapidity of the appliances described above.

In the mine depicted in Figure 8, the coal face 105 on the left hand side of the drawing is likely to be most liable to risk of explosion because the ventilating air is first drawn over the other two coal faces, which have been driven further into the coal, and consequently the ventilating air may be contaminated with gas before it reaches the coal face shown on the left hand side of the drawing.

Figure 10:
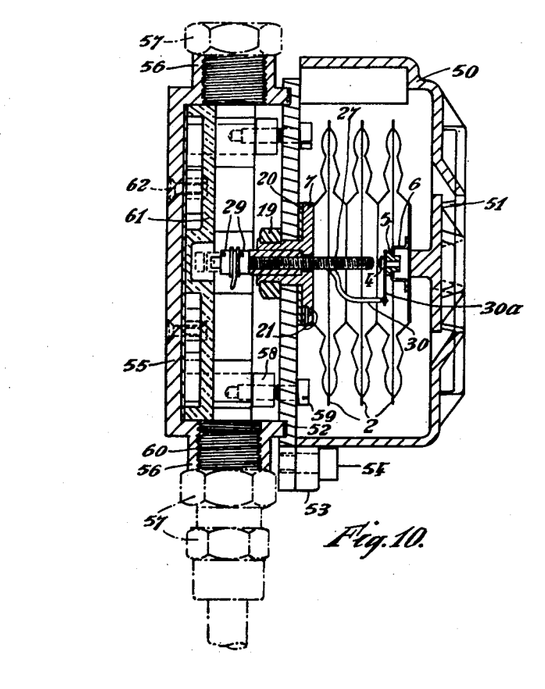
Figure 10 is an appliance similar to that shown in Figure 1 but modified to make it more suitable for use in mines.
Figure 11:
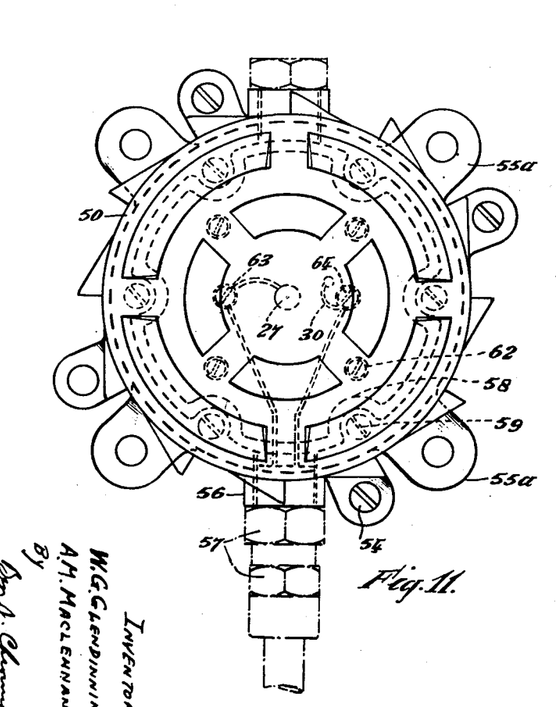
Figure 11 is a similar view of Figure 10 to Figure 2 of Figure 1.

The type of explosion detecting appliance to be used in mines is shown in Figures 10 and 11 and it will be seen that the capsules 2 are mounted in a protective cover 50 such as a brass casting which is provided with louvres or openings 51 which ensure that capsules 2 are subjected to the atmospheric pressure surrounding the appliance while at the same time they are protected against mechanical damage or displacement. The cover 50 is secured to a base plate 52 by lugs 53 and screws 54 said base plate being secured to a main casting 55 which is provided with screw threaded bosses 56 to which electrical leads are connected by union fittings 57. Two bosses 56 are provided on casting 55 so as to permit two leads to extend from the explosion detecting device to explosion suppressing device of the kind shown in Figures 3 and 4 or of the kind shown in Figures 12 and 13. Plate 52 is secured to main casting 55 by lugs 58 and screws 59, a moisture excluding washer 60 being provided as shown in Figure 10 between these parts. In the bottom base casting 55 is mounted an insulation plate 61 secured by screws 62 on which plate are mounted terminals 63 and 64, to which leads 30 and contact screw 27 are connected. Base plate 55 is provided with lugs 55a which facilitate securing the whole appliance to the wall or ceiling in a mine gallery by rag bolts or the like.

Figure 12:
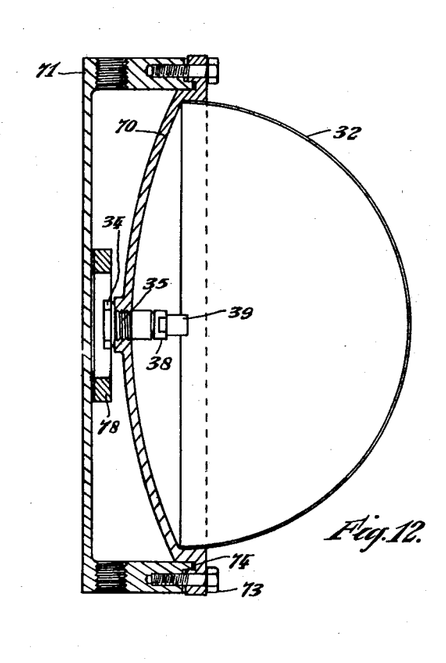
Figure 12 is a view of an appliance similar to that shown in Figure 3, but modified to be more suitable for use in mines.
Figure 13:
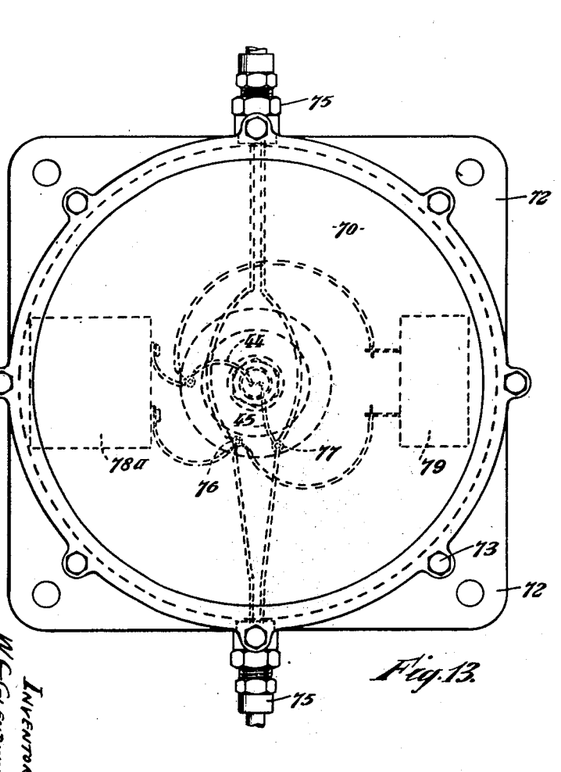
Figure 13 is a similar view of Figure 12 to Figure 4 of Figure 3.

An explosion suppressing material container similar to that shown in Figures 3 and 4, but of larger capacity and more suitable for mounting in mines, is shown in Figures 12 and 13 in which a frangible or tearable hemisphere 32 is secured in a brass or gun metal casting 70 this being mounted upon a similar material base mounting 71. Base 71 is provided with stout lugs 72 adapted for securing the appliance to mine walls or roofs by long rag bolts, and studs 73 secure parts 70 and 71 together by a sealing joint 74. Cable or electrical lead glands 75 are provided upon base 71 to permit electrical wiring to appliance B as shown in Figures 10 and 11 and detonator wires 44 and 45 are connected to terminals 76 and 77 on insulation ring 78 mounted in base 71.

In this appliance an electric battery 78 is removably secured in base 71 to ignite the device 37 (Figure 3) and an electric condenser 79 of suitable capacity is connected across its terminals to speed up ignition of the igniter device and the explosion of the explosive charge.

An explosion detector appliance B but of the construction shown in Figures 10 and 11 will be mounted near the coal face in the roadway or gallery leading into and therefrom as shown in Figure 8, and, after an explosion occurs, the pressure rise will impinge upon appliance B when this is reached, and consequently it should be as near to the coal face as is possible but a distance away from the coal face of 5 to 10 ft. would normally not be objectionable.

An appliance C of the construction shown in Figures 12 and 13 scatters explosion suppression substance across the roadway 102 within .05 second, it being assumed that the whole operation be completed within .1 second, and if the speed of propagation of the explosive wave is 20 ft. per second, it will be seen that the explosive wave can be intercepted after it has passed appliance B by a few feet.

In order however to create a counter explosive wave by appliance C, two of these would normally be mounted in a mine roadway or gallery, as shown in Figure 9, in the corners of the roof so as to project substance across the roadway, and in order to create a counter explosive wave appliance C would normally be spaced some 10 to 20 ft. from appliance B away from the assumed origin of explosion, and as the explosion suppression substance may be projected along the roadways towards the coal face, and away therefrom, a deep curtain of explosion suppression substance can be created through which the explosive wave will not penetrate.

To ensure suppression of the explosion at its point of origin, additional appliances C will be mounted as near the coal face 105 as is reasonably practical and the substance scattered by these appliances will tend to extinguish any flames which might be burning at the coal face, so as to avoid risk of restriking in case ventilating air carries gas laden air to the seat of the explosion.

Needless to say explosions may occur at other points in mines apart from the coal face, for example electrical equipment such as transformers are frequently used, and damaged electrical leads or mechanical damage to transformers may cause electrical sparks, and consequently an appliance B will normally be mounted adiacent such potential fire or electrical spark source with an appliance C mounted on either side a sufficient distance away to ensure suppression of any explosion which may be caused.

As regards explosion suppression substance, the most effective known is methyl bromide, partly due to its high density in liquid form and to its high volatility in vapour form, but primarily owing to its exceptional fire or combustion inhibiting properties, but other substances including stone dust or other fire extinguishing powders may be used instead of methyl bromide or similar liquids, or in addition thereto.

It is known that methyl bromide is slightly toxic, but the effects of inhaling the vapours by a human being are not serious unless the concentration is extremely high or unless exposure is prolonged to a matter of several minutes. Under mining conditions however the concentration will be extremely low and owing to ventilation the fumes or vapours will soon be drawn away and dispersed, so exposure should not be for more than a few seconds, and compared with the advantages obtained by suppressing explosions the risk due to toxic effect of methyl bromide is quite negligible.

The invention has other applications to those described above, for example, in the suppression of explosion in dust or flour charged air such as occurs in various industrial processes, such as cotton spinning and flour milling. And whenever reference is made in the specification and claims to the prevention of a dangerous explosion or fire in inflammable or combustible air mixtures or to combustive explosion in a potentially explosive fluid environment, it is understood that such reference includes the suppressing of explosion or fire in dust, flour or similarly charged air mixtures.

What we claim and desire to secure by Letters Patent is:

1. Apparatus for preventing a dangerous explosion in an enclosed space containing a combustible air mixture subject to normal pressure variations, comprising in combination, a pressure rate of rise detector having a pressure rate of change sensitive diaphragm operatively responsive to a rising pressure in said tank once the pressure increases at an abnormal rate and before a predetermined elevated pressure sufficient to rupture said enclosed space is reached, a shatterable container disposed in said tank and normally holding a quantity of material for suppressing an explosion, and electrically operable explosive means operatively associated with said container and electrically coupled to said detector for operation thereby explosively to shatter said container to scatter said material substantially throughout the interior of said enclosed space before said elevated pressure is reached.

2. Apparatus according to claim 1, wherein said explosive means comprises a rapidly-acting detonator having its explosive charge disposed within said container.

3. Apparatus for preventing a dangerous explosion according to claim 2, wherein the coupling between said detonator and said detector comprises a source of voltage, a normally open and de-energized electric circuit including said voltage source and the ignition portion of said detonator, and electric contact means forming part of said circuit and responsively associated with said diaphragm to close and energize said circuit and fire said detonator when said diaphragm responds to said abnormal rising pressure.

4. Apparatus according to claim 1 wherein said shatterable container comprises a rigid backing member adapted to be secured within said enclosed space, and a frangible cup-shaped member having a mouth secured to said backing member to define a receptacle for said material.

5. Apparatus according to claim 4 wherein said rigid backing member has an aperture therein for initially filling the receptacle with said material, a plug fitted within said aperture to close off the aperture after filling, and said explosive means being mounted in said plug and extending within the container.

6. The method of suppressing a combustive explosion in an environment containing a combustible mixture, wherein said explosion is characterized by a relatively slow rate of pressure rise for at least the first 0.020 of a second, comprising the steps of detecting an incipient explosion in said environment during the period of relatively slow rate of pressure rise and before the incipient explosion has caused the pressure in said environment to rise by more than substantially one pound per square inch, and immediately thereafter distributing throughout said environment a quantity of combustion inhibiting material before the pressure in said environment has risen by a further two pounds per square inch, thereby preventing an explosion.

7. The method of suppressing a combustive explosion in an environment containing a combustive mixture and subject to normal pressure variations, said explosion being characterized by a relatively slow rate of pressure rise for at least the first 0.020 of a second, comprising the steps of detecting an incipient explosion in said environment during the period of relatively slow rate of pressure rise and before the incipient explosion has caused the pressure in said environment to rise by more than approximately one pound per square inch, and within a further 0.050 of a second, explosively distributing throughout said environment a quantity of combustion inhibiting material thereby preventing an explosion.

8. Apparatus for suppressing a combustive explosion in an environment containing a combustible mixture, wherein said explosion is characterized by a relatively slow rate of pressure rise for at least the first 0.020 of a second, comprising in combination, an incipient-explosion detecting device including switch means operative during the period of relatively slow rate of pressure rise and before the incipient explosion has caused the pressure in said environment to rise by more than approximately one pound per square inch, an electrically triggered explosively operable distributor of combustion inhibiting material, and electrical means coupling said distributor to said switch means whereby operation of said switch means will cause electrical triggering of said distributor to effect a rapid distribution of said material throughout said environment before the pressure in said environment has risen by a further two pounds per square inch, thereby preventing an explosion.

9. Apparatus for suppressing a combustive explosion in a fuel tank containing a combustible mixture and subject to normal pressure variations, said explosion being characterized by a relatively slow rate of pressure rise for at least the first 0.020 of a second, comprising in combination, an incipient-explosion detecting device mounted within said tank, said detecting device including switch means operative during the period of relatively slow rate of pressure rise and before the incipient explosion has caused the pressure in said environment to rise by more than approximately one pound per square inch, a shatterable container of combustion inhibiting material also mounted within said tank, said container having mounted therein an electrically ignited explosive charge, and electrical means coupling said electrically ignited explosive charge to said switch means whereby operation of said switch means will ignite said explosive charge and cause a rapid distribution of said combustion inhibiting material throughout said tank before the pressure in said tank has risen by a further two pounds per square inch, thereby preventing rupture of said tank.

10. Apparatus for preventing a dangerous combustive explosion in a potentially explosive environment, wherein said explosion is characterized by a relatively slow rate of pressure rise during its incipient stages comprising in combination, a pressure rate of rise detector disposed in said environment for detecting said relatively slowly rising pressure accompanying an incipient explosion, a device disposed in said environment for dispersing a quantity of combustion suppressing material, and electrically operated explosive means operatively associated with said device and coupled with said detector for detector controlled operation to explosively project the material from said device into said environment before the pressure in said environment, rising at said slow rate, reaches an elevated level of dangerous magnitude.

11. Apparatus for preventing a dangerous explosion according to claim 10, wherein said pressure rate of rise detector comprises a pressure rate of change sensitive diaphragm, and said coupling between said explosive means and said detector comprises a source of voltage, a pair of normally open contacts associated with said diaphragm, and means intercoupling said source of voltage, said contacts and said explosive means whereby explosive means is ignited upon closure of said contacts in response to movement of said diaphragm.

12. Apparatus according to claim 11, further comprising means for adjusting the spacing between said pair of contacts.

13. Apparatus according to claim 10 wherein said detector comprises diaphragm means, said diaphragm means being disposed inside a liquid container the interior of which constitutes said environment, and shielding means at least in part enveloping said diaphragm means to protect said diaphragm means from false operation due to surges of liquid in said container.

14. A distributing device for a fire or explosion suppressing liquid comprising a cup-shaped frangible member, a rigid non-frangible back plate, said cup-shaped member having a mouth secured with a liquid-tight seal to said back plate to thereby form a container for said liquid, and an electrically ignitable explosive element rigidly supported by said back plate with its explosive portion located within said container adjacent said back plate and arranged to be surrounded, at least in part, by said liquid whereby said liquid will be projected with a substantially hemispherical spray pattern having its origin at the location of said explosive portion and lying wholly on the explosive side of said rigid back plate.

15. A distributing device for fire or explosion suppressing liquid comprising a container having a substantially hemispherical frangible wall for holding said liquid, a rigid back plate to which the mouth of said frangible wall is secured to form a liquid tight seal, and an electrically operated detonator supported by said back plate and extending along the axis of sail hemispherical wall and having its explosive charge extending into the hemisphere beyond the center point thereof, whereby upon detonation of said explosive charge said hemispherical wall is ruptured and said liquid is scattered in all directions on the explosive side of said back plate.

16. Apparatus according to claim 10 wherein said detector comprises diaphragm means, said diaphragm means forming at least a part of a wall of a chamber closed off except for a bleed aperture providing communication between the interior and exterior of said chamber, whereby normal variations in external pressure are ineffective to cause movement of said diaphragm means.

17. Apparatus according to claim 10 wherein said explosive environment exists in an aircraft further comprising crash-responsive means coupled to said electrically operated explosive means for ignition thereof in the event of a crash to project said material substantially throughout said explosive environment.

18. Apparatus according to claim 10 wherein said explosive environment exists in an aircraft fuel tank, further comprising fire extinguishing means disposed exteriorly of said fuel tank and coupled to said detector for operation in response to the operation of said detector to spray the exterior of the tank with fire extinguishing material.

References Cited in the file of this patent

UNITED STATES PATENTS

| Number | Name | Date |
|---|---|---|
| 1,022,368 | Kruskopf | Apr. 2, 1912 |
| 1,143,970 | Kayser et al. | June 22, 1915 |
| 1,182,000 | Edwards | May 9, 1916 |
| 1,453,091 | Delbare | Apr. 24, 1923 |
| 1,708,869 | Buddecke | Apr. 9, 1929 |
| 1,941,700 | Lowe | Jan. 2, 1934 |
| 2,385,825 | Mathisen | Oct. 2, 1945 |
| 2,425,778 | Allen | Aug. 19, 1947 |
| 2,450,569 | Thompson | Oct. 5, 1948 |